(12) United States Patent
Weldon

(10) Patent No.: US 11,032,317 B1
(45) Date of Patent: *Jun. 8, 2021

(54) PHISHING SCHEME DETECTION AND TERMINATION

(71) Applicant: United Services Automobile Association (USAA), San Antonio, TX (US)

(72) Inventor: Duane E. Weldon, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/825,730

(22) Filed: Mar. 20, 2020

Related U.S. Application Data

(63) Continuation of application No. 15/802,741, filed on Nov. 3, 2017, now Pat. No. 10,609,072.

(60) Provisional application No. 62/418,530, filed on Nov. 7, 2016.

(51) Int. Cl.
*H04L 29/06* (2006.01)
*H04L 29/08* (2006.01)
*H04L 12/58* (2006.01)

(52) U.S. Cl.
CPC .......... *H04L 63/1483* (2013.01); *H04L 51/12* (2013.01); *H04L 63/1416* (2013.01); *H04L 63/1425* (2013.01); *H04L 67/02* (2013.01)

(58) Field of Classification Search
CPC ..... H04L 51/12; H04L 51/18; H04L 63/1416; H04L 63/1425; H04L 63/1483; H04L 63/02
See application file for complete search history.

(56) References Cited

U.S. PATENT DOCUMENTS

| 7,841,003 | B1 | 11/2010 | Emdee |
| 2005/0182938 | A1 | 8/2005 | Seshadri et al. |
| 2005/0283609 | A1* | 12/2005 | Langford ............... G06F 21/645 713/176 |
| 2015/0032827 | A1 | 1/2015 | Tyler et al. |
| 2016/0191548 | A1* | 6/2016 | Smith .................... G06F 21/565 726/23 |
| 2018/0375877 | A1* | 12/2018 | Jakobsson ............. G06F 16/955 |
| 2019/0379660 | A1* | 12/2019 | Thirumavalavan ........................ H04W 12/084 |

OTHER PUBLICATIONS

Naik, Bhavesh, "Tracking User Activities Using Web Bugs," https://resources.infosecinstitute.com/tracking-user-activities-using-web-bugs/#gref, Nov. 25, 2013, 14 pages.
Chandramouli, Ramaswamy, et al., "Trustworthy Email," NIST Special Publication 800-177, Sep. 2016, 98 pages.

* cited by examiner

*Primary Examiner* — June Y Sison
(74) *Attorney, Agent, or Firm* — Greensfelder, Hemker & Gale, P.C.; Joseph A. Fuchs

(57) ABSTRACT

The present invention is a system and method for detecting malicious use of a company email.

20 Claims, 3 Drawing Sheets

FIG. 1

PHISHING SCHEME DETECTION AND TERMINATION

CROSS-REFERENCE TO RELATED APPLICATIONS

The present invention is a continuation of U.S. patent application Ser. No. 15/802,741 filed Nov. 3, 2017, which claims the benefit of U.S. Provisional Patent Application No. 62/418,530 filed Nov. 7, 2016, which is incorporated in its entirety herein by reference and made a part hereof.

FEDERALLY SPONSORED RESEARCH OR DEVELOPMENT

N/A

FIELD OF THE INVENTION

The present invention provides a system and method for improving on the technology of detecting malicious use of a company email by a fraudster. When a unique email of the company sends an aberrant number of requests for GIF images to a host server, a decision is made at a threshold value that the unique email is being used for improper purposes. Requests for GIF image downloads in excess of the threshold value are deemed to be illegitimate and are countered with a return image, such as a red X, to indicate the email is bogus.

DESCRIPTION OF THE PRIOR ART

Fraudulent use of email by fraudsters is commonplace. To perpetrate email scams such as spamming and phishing, a fraudster will generate emails that appear to be from a legitimate source, but instead, are from an entity pushing the sale of goods and services, or for tricking the recipient into transmitting to the fraudster confidential information like social security numbers, account numbers, and passwords. The fraudster can use or sell the information to support a scheme to steal money from the unwary individual. Often times a fraudster will hijack a company email to perpetrate a fraud. This can lead to an embarrassing situation for the company whose email has been spoofed and a loss of credibility.

SUMMARY OF THE INVENTION

The present invention provides a method for detecting and halting a malicious use of an email of a company. The method includes the steps of: (1) providing a company email server implementing a company email service with a plurality of email addresses with a common domain name of the company; (2) assigning an electronic identification (EID) number to each email sent by the company server to uniquely identify each email to define a unique email; (3) embedding in each email sent from the email server, a first code when executed sends a request to download a GIF image from a host server at an absolute source link; (4) embedding in each of the emails sent, a second code when executed, transmits the EID number of the email from which the GIF request emanated to the host server; (5) providing the host server for responding to the request to download the GIF image; (6) counting the number of requests for download associated with each EID number at the host server; and (7) returning the requested GIF image if the number of requests for download or the download rate are not aberrant.

BRIEF DESCRIPTION OF THE DRAWINGS

To understand the present invention, it will now be described by way of example, with reference to the accompanying drawings and attachments in which.

DETAILED DESCRIPTION

Figure 1:
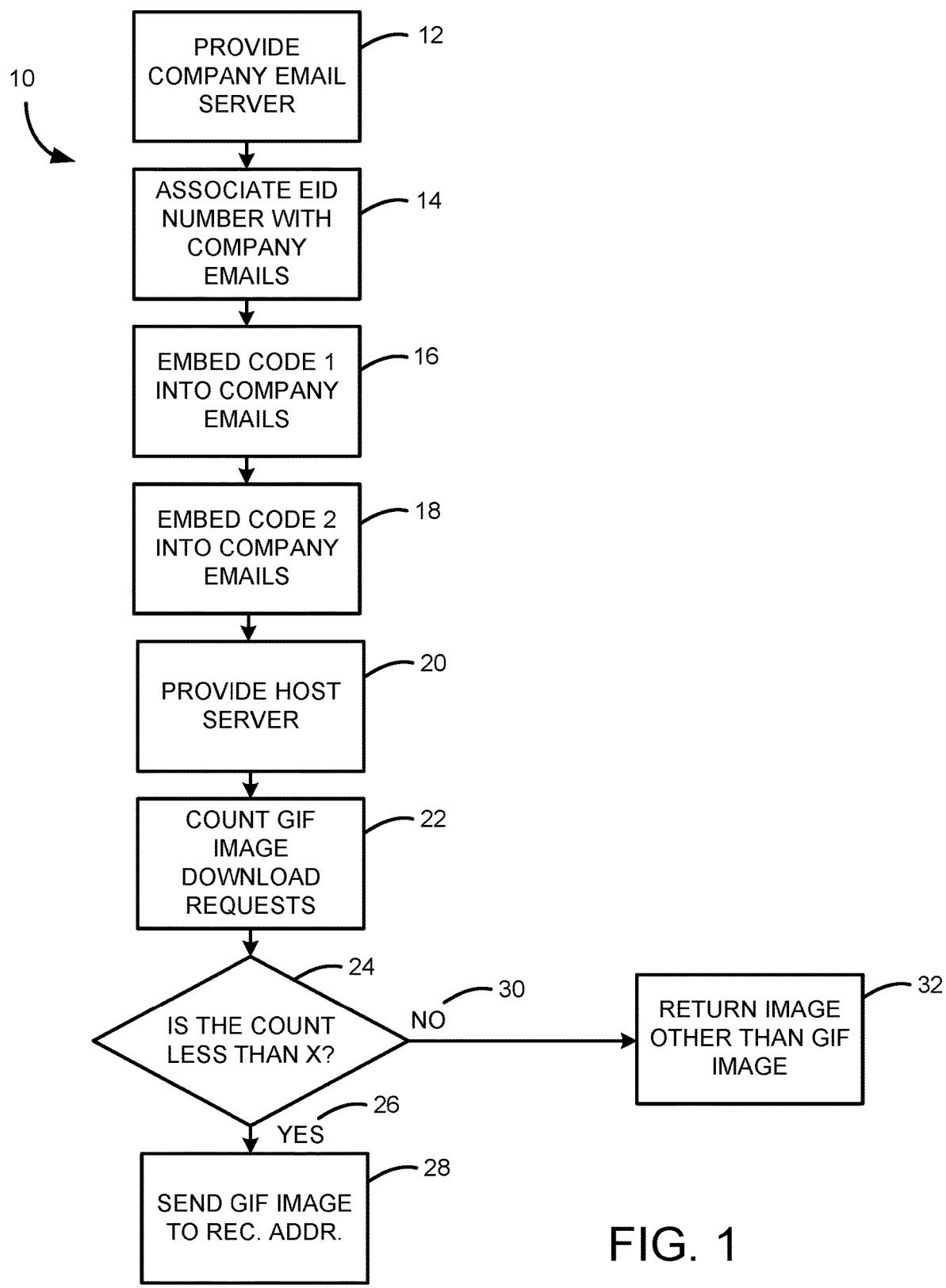
FIG. 1 is a flowchart of a method of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention provides a system and method for improving on the technology of detecting malicious use of a company email by a fraudster. When a unique email of the company is associated with an aberrant number of requests for GIF images from a host server, a decision is made at a threshold value that the unique email is being used for improper purposes. Requests for the GIF image thereafter are considered to be illegitimate and are countered by a return image, such as a red "X" in a box to indicate the email is bogus. The system for carrying out the method will utilize conventional servers having processors and memory for containing software that when executed by the processor takes the steps of a method shown in FIG. 1.

FIG. 1 shows an exemplary method 10 for detecting and halting a malicious use of an email of a company. It is common when receiving an email message from a particular company for an indicia of the company to be displayed to a recipient in a designated area of the email. Such indicia can include a color image of the company name, a company trademark or other visual symbol associated with the company. The image can be a still image or an animated image. Typically the image files are not sent with the email, but are automatically requested and obtained from a host server upon downloading or opening of the email. The request and downloading of the requested image is accomplished by a set of software instructions, or a first code, embedded in the email. In one form of the invention, the image is in the form of a GIF file.

Malicious use includes email spoofing—the creation of an email message with a forged sender address. It is common for spam and phishing emails to utilize spoofing to give the appearance the email is from a legitimate source and purpose. In one form of spoofing, a legitimate company email is copied and used to send spam or phishing email to a list of recipient email addresses acquired from a source.

In step 12 a company provides a company email server implementing a company email service. The email service will be software such as Microsoft's OUTLOOK and will support the sending and receiving of electronic messages over the Internet, World Wide Web or other electronic network. The company email service supports a plurality of email addresses with a common domain name of the company. Typically, a company email address will have a designated format based on a user name such as: First Name Last Name@Company Domain Name.top-level domain name.

In step 14, the company associates an electronic identifier (EID) number to uniquely identify each email sent by the company email server. The EID number can be a combination of an employee number, a portion of a social security number, and other number or other designation to uniquely identify the email. More preferably, the EID number will also identify the email sender.

In step 16, the company embeds, in a plurality of emails sent from the email server, a first code to be executed by an email server of a recipient address, to send a request to download a GIF image, or other image file, from a host server at an absolute source link. An absolute source link specifies a location with sufficient specificity to be reached from any location, for example, http://www.yourserver.com/email/images/logo.gif.

In step 18, the company embeds in the plurality of emails a second code when executed instructs the recipient server to transmit the EID number of the unique email from which the GIF image request emanated. Every GIF image request is accompanied by an EID number.

In step 20, a host server is provided for responding to the request to download the GIF image. In step 22 the host server counts the number of requests for download for each EID number. In step 24, the count is compared to a threshold value such as a maximum number of requests, say 10 requests, or a maximum request rate expressed in number of requests per period of time, say 100 requests over seven days. If the request number or request rate is below the threshold value 26 then the host server assumes the request is legitimate and returns the requested GIF image in step 28. If, however, the number of requests or the request rate is in excess of the threshold value then an image other than the requested image is returned. The "other image" can be a visual indication that the email is bogus and unreliable. One such image is that of a red "X" inside a square box.

Figure 2:
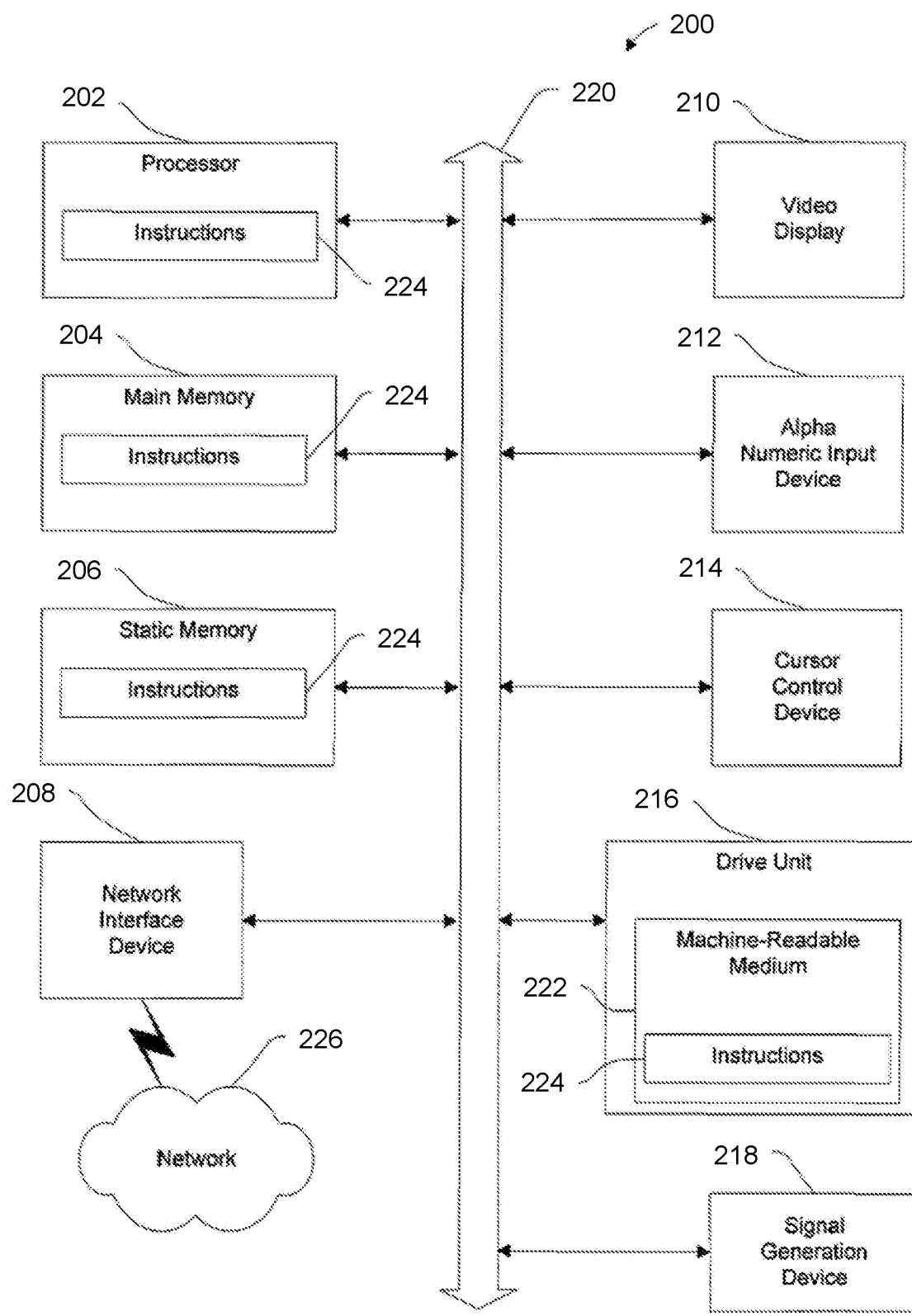
FIG. 2 is a diagrammatic representation of a computer system for carrying out the method of FIG. 1.

FIG. 2 is a diagrammatic representation of a machine 200 in an example form of a computer system within which a set of instructions, for causing the machine to perform the methodologies discussed herein, may be executed. In alternative embodiments, the machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 2, the example computer system 200 includes a processor 202 (e.g., a central processing unit (CPU), a graphics processing unit (GPU) or both), a main memory 204 and a static memory 206, which communicate with each other via a bus 220. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 208.

Still further with reference to FIG. 2, the disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media. The software 224 may further be transmitted or received over a network 226 via the network interface device 208 utilizing any one of a number of well-known transfer protocols (e.g., HTTP).

Last with reference to FIG. 2, while the machine-readable medium 222 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Figure 3:
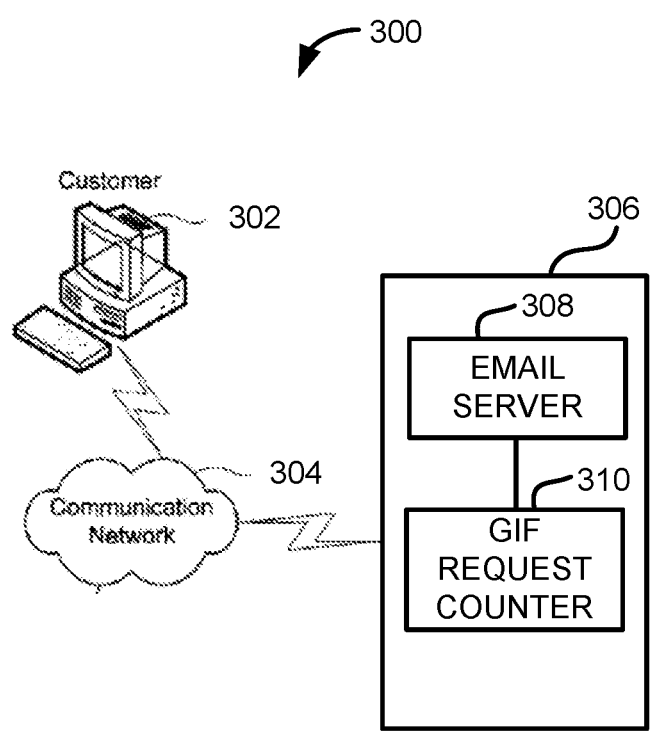
FIG. 3 is a high-level block diagram of a system for detecting fraudulent use of a company's email server.

FIG. 3 shows a system 300 for detecting anomalous use of a company's email server in accordance with the method described with respect to FIG. 1. The system 300 has a user or customer computer 302, a communication network 304, a company server system 306 including an email server 308 and a GIF request counter module 310. The customer computer 302 can be any device for electronically communicating with the electronic network 304 and includes cell phones, personal computers and the like. The communication network 304 can be an electronic network such as the Internet, World Wide Web, and the like. The web server 308 can be as described with respect to FIG. 2. The GIF request counter module 310 is a module for carrying out the method of FIG. 1 and upon aberrant requests for a GIF image taking corrective action.

Many modifications and variations of the present invention are possible in light of the above teachings. It is, therefore, to be understood within the scope of the appended claims the invention may be protected otherwise than as specifically described.

I claim:

1. A method for detecting and halting a malicious use of an email of a company comprising:
providing a company email server implementing a company email service with a plurality of email addresses with a common domain name of the company;
assigning an electronic identification (EID) number to each email sent by the company server to uniquely identify each email to define a unique email;
embedding in each email sent from the email server, a first code when executed sends a request to download a GIF image at an absolute source link;
providing a GIF request counter module;
embedding in each of the emails sent, a second code when executed, transmits the EID number of the email from which the GIF request emanated to the host server;
counting with the GIF request counter module the number of requests for download associated with each EID number; and,
returning an indicium of a fraudulent email if the number of requests for download or the download rate of the GIF image is aberrant, wherein the indicium is displayed in the security region of the email.

2. The method of claim 1 wherein the email service is HTML email.

3. The method of claim 2 wherein the first code and the second code are part of an HTML image tag associated with the GIF image.

4. The method of claim 1 wherein the indicium of a fraudulent email is an "X" in a box.

5. The method of claim 1 wherein the GIF request counter is resident on a host computer.

6. The method of claim 1 further comprising the step of returning the requested GIF image if the number of requests for downloading or the download rate is not aberrant.

7. A system for detecting and halting a malicious use of an email of a company having an email server, a processor and a memory for storing machine readable instructions when executed by the processor take the steps comprising:
a company email server implementing a company email service with a plurality of email addresses with a common domain name of the company and configured to assign an electronic identification (EID) number to each email sent by the company email server to uniquely identify each email to define a unique email, embed in each email sent from the email server, a first code when executed sends a request to download a GIF image at an absolute source link, and embedding in each of the emails sent, a second code when executed, transmits the EID number of the email from which the GIF request emanated to the absolute source link;
a GIF counter module for counting the number of requests for download associated with each EID number; and,
a communication module associated with the company email server for returning an indicium of a fraudulent email if the number of requests for download or the download rate of the GIF image is aberrant, wherein the indicium is displayed in the security region of the email.

8. The system of claim 7 wherein the email service is HTML email.

9. The system of claim 7 wherein the first code and the second code are part of an HTML image tag associated with the GIF image.

10. The system of claim 7 wherein the indicium of a fraudulent email is an indicum other than the requested GIF image.

11. The system of claim 10 wherein the other indicum is an "X" in a box.

12. The system of claim 7 wherein the GIF request counter is resident on a host computer.

13. The system of claim 7 further comprising the step of returning the requested GIF image if the number of requests for downloading or the download rate is not aberrant.

14. A non-transitory machine readable medium for storing machine-readable instructions when executed by a processor take the steps comprising:
providing a company email server implementing a company email service with a plurality of email addresses with a common domain name of the company;
assigning an electronic identification (EID) number to each email sent by the company server to uniquely identify each email to define a unique email;
embedding in each email sent from the email server, a first code when executed sends a request to download a GIF image at an absolute source link;
providing a GIF request counter module;
embedding in each of the emails sent, a second code when executed, transmits the EID number of the email from which the GIF request emanated to the GIF request counter module;
counting with the GIF request counter module the number of requests for download associated with each EID number; and,
returning an indicium of a fraudulent email if the number of requests for download or the download rate of the GIF image is aberrant, wherein the indicium is displayed in the security region of the email.

15. The non-transitory machine-readable medium of claim 14 wherein the email service is HTML email.

16. The non-transitory machine-readable medium of claim 14 wherein the first code and the second code are part of an HTML image tag associated with the GIF image.

17. The non-transitory machine-readable medium of claim 14 wherein the indicium of a fraudulent email is an indicum other than the requested GIF image.

18. The non-transitory machine-readable medium of claim 17 wherein the other indicum is an "X" in a box.

19. The non-transitory machine-readable medium of claim 14 wherein the GIF request counter is resident on a host computer.

20. The non-transitory machine-readable medium of claim 14 further comprising the step of returning the requested GIF image if the number of requests for downloading or the download rate is not aberrant.

* * * * *